(12) United States Patent
Oh

(10) Patent No.: US 7,559,709 B2
(45) Date of Patent: Jul. 14, 2009

(54) IRIS DIAPHRAGM DEVICE, DIAPHRAGM DRIVING DEVICE AND CAMERA UNIT INCLUDING THE SAME, AND DIAPHRAGM CONTROL METHOD

(75) Inventor: Eui-kuen Oh, Suwon-si (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 258 days.

(21) Appl. No.: 11/067,675

(22) Filed: Mar. 1, 2005

(65) Prior Publication Data

US 2005/0238348 A1 Oct. 27, 2005

(30) Foreign Application Priority Data

Apr. 23, 2004 (KR) .................. 10-2004-0028128

(51) Int. Cl.
*G03B 9/02* (2006.01)
*G03B 11/00* (2006.01)

(52) U.S. Cl. ..................................... 396/510

(58) Field of Classification Search ................. 396/510, 396/241
See application file for complete search history.

(56) References Cited

U.S. PATENT DOCUMENTS

| 4,113,359 | A | | 9/1978 | Koike |
| 5,394,212 | A | * | 2/1995 | Morizumi ................... 396/505 |
| 6,139,202 | A | * | 10/2000 | Depatie et al. .............. 396/449 |
| 6,533,473 | B1 | | 3/2003 | Edamitsu |
| 6,771,315 | B1 | | 8/2004 | Nanjo et al. |
| 2003/0202791 | A1 | | 10/2003 | Sato et al. |
| 2005/0073604 | A1 | * | 4/2005 | Umezu ....................... 348/363 |

FOREIGN PATENT DOCUMENTS

| DE | 2713076 A * | 2/1978 |
| EP | 1099976 | 5/2001 |
| JP | 02067530 | 3/1990 |
| JP | 2000 106649 | 4/2000 |
| JP | 2004 020711 | 6/2004 |

* cited by examiner

*Primary Examiner*—W. B. Perkey
(74) *Attorney, Agent, or Firm*—Roylance, Abrams, Berdo & Goodman, L.L.P.

(57) ABSTRACT

An iris diaphragm device has at least one lens shutter for adjusting the size of an aperture through which incident light passes. At least one ND filter is installed to move independently of the lens shutter, and reduces the amount of incident light by covering the aperture stopped down by the lens shutter.

47 Claims, 11 Drawing Sheets

IRIS DIAPHRAGM DEVICE, DIAPHRAGM DRIVING DEVICE AND CAMERA UNIT INCLUDING THE SAME, AND DIAPHRAGM CONTROL METHOD

CROSS-REFERENCE TO RELATED APPLICATIONS

This application claims the benefit under 35 U.S.C. § 119 (a) of Korean Patent Application No. 2004-28128 filed Apr. 23, 2004, in the Korean Intellectual Property Office, the entire disclosure of which is hereby incorporated by reference.

BACKGROUND OF THE INVENTION

1. Field of the Invention

The present invention relates generally to an image photographing device for photographing and recording and storing image data. More particularly, the present invention relates to an iris diaphragm, a diaphragm driving device, and a camera unit including the same, and a diaphragm control method.

2. Description of the Related Art

A camcorder is a representative example of an image data recording and reproducing device, and is widely used today for photographing moving images and still images. A camcorder includes a camera unit, a signal conversion unit, a deck for recording and reproducing photographed images, and a display unit. The camcorder usually uses a cassette tape as a recording medium to record photographed image data. Also, in recent years, attention has been focused on a small-sized, light-weight image recording and reproducing device using a compact-sized recording medium, such as a hard disk drive. The small-sized, light-weight device was made possible because a deck is not included in the image recording and reproducing device using a hard disk drive.

The camera unit and a lens barrel with a focusing lens and a zoom lens are packed in a module and are installed inside the main body of a product. The focusing lens and the zoom lens are driven by a motor installed in the lens barrel.

The lens barrel includes a lens shutter for adjusting the amount of incident radiation. In effect, a plurality of motor-driven shutter members adjust the amount of incident light passing through the lens while moving.

According to the above configuration, in addition to the lens motor, a plurality of motors are arranged outside of the lens barrel. Theses types of motors are disadvantages for reducing the size of the camera unit.

Moreover, as the motor is mounted on the outer side of the cylindrical lens barrel, the lens barrel has the angular outer configuration only. Therefore, there is a limit in the designing of the lens barrel.

A Neutral Density (ND) filter is also housed in the lens barrel. The ND filter reduces the amount of incident light that passes through the lens, and suppresses an occurrence of diffraction where resolution is noticeably reduced at a high brightness level. As a result, resolution is much improved.

However, a problem arises as the ND filter is bonded or coupled to the lens shutter and moves with the lens shutter as one body. Despite the changes of the diaphragm of the lens or the opening degree of the lens shutter, a part of the light path is always blocked by the ND filter. Although this fact does not have a great impact on the resolution at high brightness, it greatly reduces resolution at low brightness so the amount of light passing through the lens is very low.

SUMMARY OF THE INVENTION

Accordingly, it is a primary object of the present invention to provide an iris diaphragm with an improved structure where an ND filter and a lens shutter are operated independently.

It is another object of the present invention to provide a diaphragm driving device with an improved structure that is capable of driving an ND filter independently with respect to a lens shutter.

It is still another object of the present invention to provide a camera unit having an ND filter that operates independently of a lens shutter.

It is still another object of the present invention to provide a diaphragm control method for separately driving a lens shutter and an ND filter.

An iris diaphragm of image photographing equipment has at least one lens shutter to adjust the size of an aperture through which incident light passes according to the position. At least one ND filter is installed to move independently of the lens shutter and to reduce the amount of incident light by covering the aperture stopped down by the lens shutter according to the position.

The ND filter may be installed to move relative to the lens shutter so that the stopped down portion by the lens shutter is varied in one section or is fixed in another section.

The ND filter in the section with the variable stopped down portion is installed to move relative to the lens shutter inversely proportional to increment of the aperture.

The ND filter may be rotatably installed around the aperture, and stop down the aperture according to the rotational position.

The lens shutter may be rotatably installed around the aperture, and vary the aperture according to the rotational position.

The ND filter and the lens shutter may be installed to rotate with respect to the same center around the aperture.

The stopped down portion and the size of the aperture may be determined in accordance with the rotational angle of the ND filter and the lens shutter, respectively.

The ND filters may have different light transmittances.

The device may include a plurality of lens shutters each with the same center of rotation for the respective ND filters.

The cam slits for the ND filters and the lens shutters may have different shapes.

The cam slit for the ND filter may be curved in a designated section.

The cam slits for the ND filters and the lens shutters may be formed to overlap in a designated section so that the ND filters and the lens shutters have the same rotational speed in the designated section.

The stopped down portion may be fixed in a section where the rotational speed is constant.

Another aspect of the present invention provides an iris diaphragm device of image photographing equipment having at least one lens shutter for adjusting an aperture through which light passes. At least one ND filter is installed to move independently of the lens shutter, and reduces the amount of incident light by covering the aperture that is opened by the lens shutter. A driving unit drives the ND filter and the lens shutter so that the stopped down portion of the aperture by the ND filter is varied in one section and is fixed in another section.

The driving unit may include a motor housing for supporting the ND filter and providing the light path. A stator assembly is installed inside the motor housing. A rotor is rotatably installed inside the stator assembly to interlock the ND filter to the lens shutter.

The ND filter may be rotatably installed in a position of the motor housing to cover the aperture being stopped down by the lens shutter according to the rotational position.

The rotor has driving pins to interlock the ND filter to the lens shutter.

The motor housing includes a boss for supporting the rotary ND filter, and a guide for guiding the motion of the driving pins.

The ND filter has a cam slit in a designated shape that is connected to the driving pin, thereby interlocking the ND filter to the driving pin.

The lens shutter may be supported by the motor housing so that the lens shutter has the same center of rotation as the ND filter.

The lens filter has a cam slit that is interlocked by a driving pin of the rotor.

The cam slits for the ND filter and the lens shutter may have different shapes.

The cam slits for the ND filter and the lens shutter may be partially overlapped according to rotational positions thereof.

The stopped portion of the aperture may be fixed in a section where the cam slits for the lens shutter and the ND filter overlap.

A change of the stopped down portion by the ND filter may be inversely proportional to the size of the aperture.

Additionally, the present invention provides a camera unit having a lens barrel, a zoom lens module housed in the lens barrel, and a focusing lens module housed in the lens barrel. At least one lens shutter is movably installed between the zoom lens module and the focusing lens module to adjust an aperture through which light passes according to the position. An ND filter is movably installed inside the lens barrel to reduce the amount of incident light by covering the aperture that is stopped down by the lens shutter. A driving unit is installed inside the lens barrel to drive the lens shutter and the ND filter in such a manner the stopped down portion of the aperture by the ND filter is varied in one section and is fixed in another section.

A method of controlling a diaphragm includes the steps of moving at least one lens shutter to stop down an aperture that incident light passes through. At least one ND filter is moved to cover the stopped down aperture and thus, to reduce the amount of incident light. The decrement of incident light is fixed or varied according to a change of the aperture size.

Decrement of the incident light may be inversely proportional to the increment of the aperture size.

The decrement of the incident light may be fixed in a designated section where the aperture is gradually reduced from a maximum.

The lens shutter and the ND filter may move together.

The variable decrement of the incident light may be obtained by differentiating rotational speeds of the lens shutter and the ND filter.

The fixed decrement of the incident light may be obtained by equalizing the rotational speed of the lens shutter to that of the ND filter.

Other objects, advantages and salient features of the invention will become apparent from the following detailed description, which, taken in conjunction with the annexed drawings, discloses preferred embodiments of the invention.

BRIEF DESCRIPTION OF THE DRAWINGS

The above aspects and features of the present invention will be more apparent by describing certain embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

The matters defined in the description, such as a detailed construction and elements thereof, are provided to assist in a comprehensive understanding of the invention. Thus, it is apparent that various changes and modifications the present invention may be made to the examples provided herein without departing from the spirit and scope of the present invention. Also, descriptions of well-known functions or constructions are not described in detail for conciseness and clarity.

An iris diaphragm, a diaphragm driving device, a camera unit and a diaphragm control method in accordance with exemplary embodiments of the present invention are described in detail with reference to the accompanying drawings.

Figure 1:
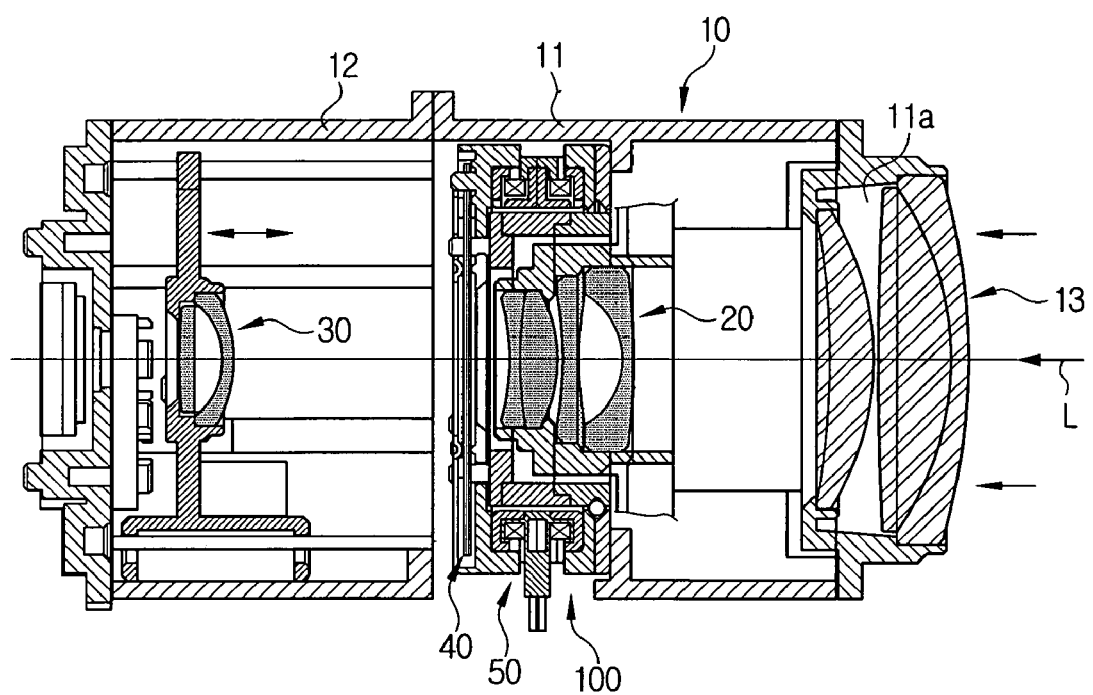
FIG. 1 is a schematic cross-sectional view of a camera unit according to one embodiment of the present invention.

Referring to FIG. 1, the camera unit according to an exemplary embodiment of the present invention includes a lens barrel 10 housing a zoom lens module 20 and a focusing lens module 30, an iris diaphragm 40 (hereinafter, it is referred to as a diaphragm unit), and a driving unit for driving the diaphragm unit 40.

The lens barrel 10 has a substantially cylindrical shape and a pair of lens barrels 11, 12 connected together. An object lens module 13 is formed on the front end of an entrance 11a of the lens barrel 11, and a substrate (not shown) having a charge coupled device (CCD) module is formed on the rear end of the lens barrel 12.

The zoom lens module 20 is movably installed in the lens barrel 10. That is, the zoom lens module moves, by help of a transfer means (not shown), back and forth for a predetermined distance inside the lens barrel in a direction substantially parallel to incident light L to zoom in and out on a subject.

The focusing lens module 30 is movably installed in the lens barrel 10. More specifically, the focusing lens module 30 is disposed beside the zoom lens module 20, and focuses a subject. Similar to the zoom lens module 20, the focusing lens module 30 moves, by help of a transfer means (not shown), back and forth for a predetermined distance inside the lens barrel in a direction substantially parallel to incident light L. The transfer means for moving each module 20, 30 may be a generally-known transfer implement. For example, a guide shaft is one option for supporting the modules 20, 30 in the lens barrel 10, and lead screws rotatable by a motor may be used to selectively move the modules 20, 30. Since people skilled in the art are already familiar with the technique related to the transfer means for the modules 20, 30, no further detail is provided.

The diaphragm unit 40 is housed in the lens barrel 10. Preferably, the diaphragm unit is disposed between the modules 20, 30. The diaphragm unit 40 adjusts the amount of incident light to the lens barrel 10, and is installed in a direction substantially transverse to the direction of incident light. The diaphragm unit 40 is explained in detail below.

Figure 2:
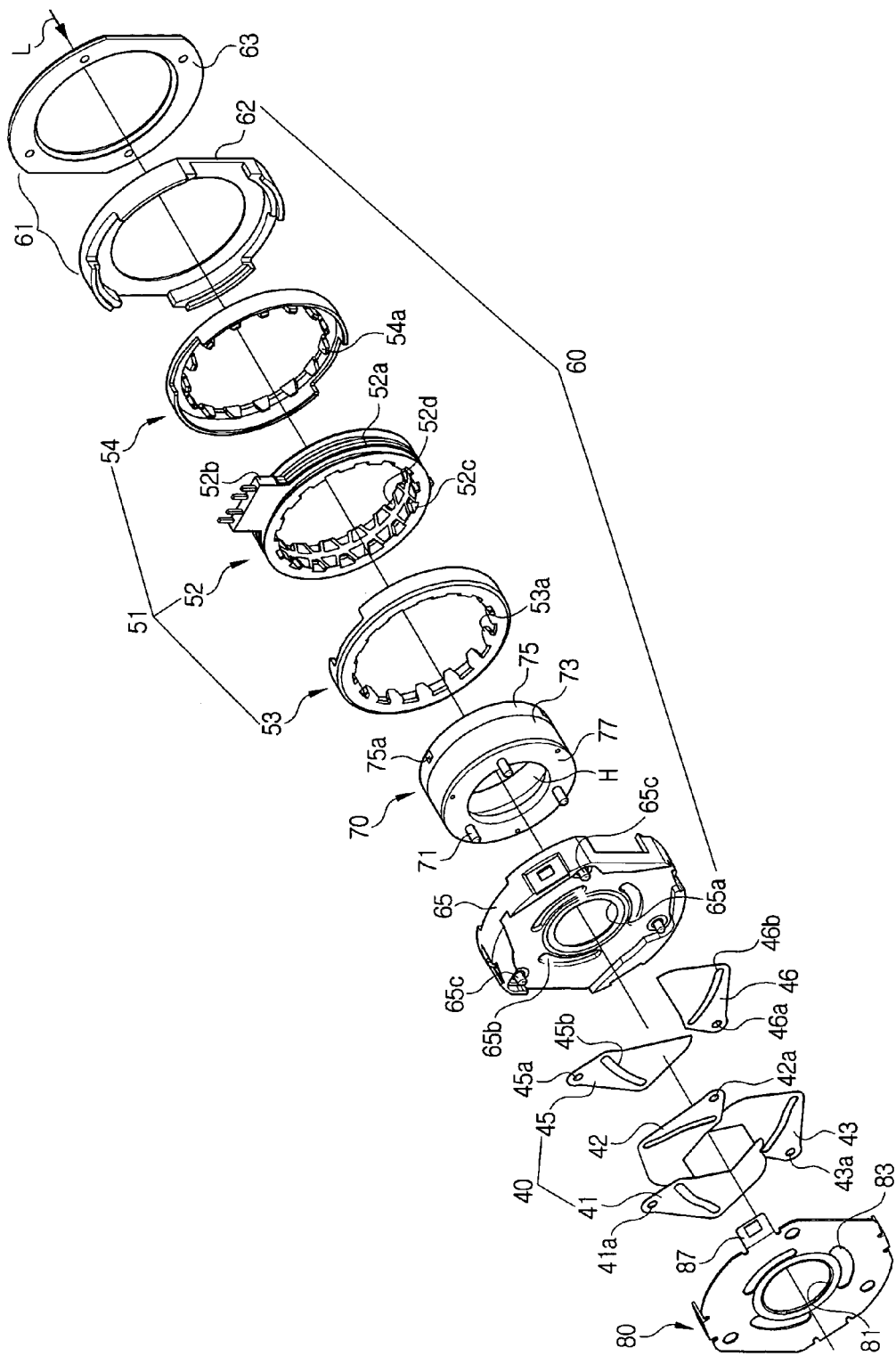
FIG. 2 is an exploded perspective view of a diaphragm driving device of FIG. 1.

The driving unit 50 is housed in the lens barrel 10. Referring to FIG. 2, the driving unit 50 includes a stator assembly 51, a motor housing 60, and a rotor 70 disposed in the stator assembly 51.

The stator assembly 51 is supported inside the motor housing 60. The stator assembly 51 includes a ring-type bobbin 52, and first and second stator members 53, 54 connected to both sides of the bobbin 52.

A coil 52a is wound around the bobbin 52, and the coil 52a is electrically coupled to an external terminal through a terminal unit 52b disposed outside the bobbin 52.

The first and second stator members 53, 54 are connected to both sides of the bobbin 52, respectively. Each of the stator members 53, 54 has fixed sectors 53a, 54a circumferentially spaced apart at regular intervals. The fixed sectors 53a, 54a are embedded in the inner circumference of the bobbin 52, being geared with each other. Also, the sector-mounting grooves 52c, 52d are formed on the inner circumference of the bobbin 52. The grooves 52c, 52d are formed to cross each other. When an electrical signal is input to the coil 52a in a designated pattern, the fixed sectors 53a, 54a are magnetized according to the input pattern of the electrical signal. A magnetic force is generated between the magnetic fixed sectors 53a, 54a and the rotor 70, and by the magnetic force the rotor 70 rotates at a designated degree at a time.

The rotor 70 is rotatably installed inside the stator assembly 51. Incident light L passes through hole H (FIG. 2) formed at the center of the rotor 70. Therefore, the rotor does not have a shaft in it. Also, a plurality of driving pins 71 geared with the diaphragm unit 40 protrude from one end of the rotor 70. In this embodiment of the present invention, three driving pins 71 are used, being spaced apart at regular intervals, although it will be appreciated that any suitable number of driving pins may be used.

Figure 3:
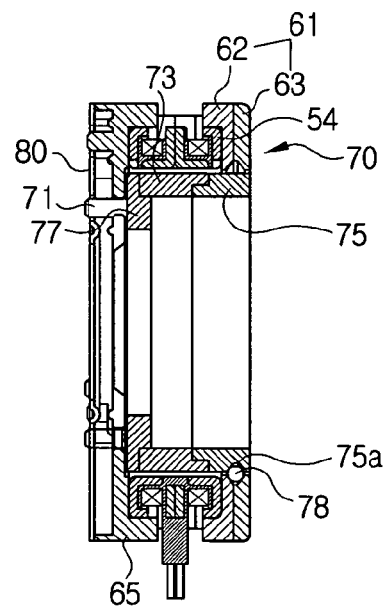
FIG. 3 is a cross-sectional view of a diaphragm driving device of FIG. 2.

As illustrated in detail in FIGS. 2 and 3, the rotor 70 includes a substantially cylinder-shaped magnet 73, a sleeve tube 75 connected to one end of the magnet 73, and a plate 77 connected to the other end of the magnet 73. The N-pole and the S-pole of the magnet 73 are spaced apart in the rotational direction. The sleeve tube 75 has a substantially similar cylindrical shape to the magnet 73 and is connected to one end of the magnet 73. A plurality of bearing mounting grooves 75a are formed on the outside circumference of the sleeve tube 75.

The bearing 78 mounted in the grooves 75a is fitted inside the motor housing 60 and is supported thereby. The plate 77 has a donut shape and is connected to the other end of the magnet 73. The plate 77 is installed such that the driving pins 71 protrude therefrom. Through an insert molding method, the driving pins 71 may be directly inserted and molded to the plate 77 during the manufacturing process. The driving pins 71 are movably installed in the motor housing 60. The center of the rotor 70 is empty, and, as aforementioned, the rotor 70 is rotatably installed inside the stator assembly 51.

In another embodiment, the sleeve tube 75 and the plate 77 may be connected to each other as one body. The entire rotor 70 is made of magnetic materials and the driving pins 71 may be simultaneously connected thereto through the insert molding method.

The motor housing 60 is fixed inside the lens barrel 10. The motor housing 60 includes first and second housings 61, 65 encompassing the stator assembly 51.

The first housing 61 supports the bearing 78 of the rotor 70. More specifically, the first housing 61, as shown in FIGS. 2 and 3, covers the second stator member 54. Front and back brackets 62, 63 may be coupled to each other. Each bracket 62 and 63 may be separately manufactured and then coupled to the second stator member 54. As a motion guide for the bearing 78, guide grooves may be formed on the borders of the brackets 62, 63. That is, when the rotor 70 rotates, the bearing 78 moves along the border of each bracket 62, 63 to support the rotor 70. Of course, the brackets 62, 63 may be formed as one body. The guide groove of the bearing 78 is formed on the inner circumference of the first housing in one body.

The second housing 65 is connected to one side of the first housing 61. The other side of the first housing 61 is connected to the stator assembly 51 disposed between the first and second housings 61, 65. A diaphragm aperture (or simply an aperture) 65a which is opened and closed by the diaphragm unit 40 is formed at the center of the second housing 65. Also, the opening 65a is surrounded by a plurality of guide slits 65b for supporting the motion of the driving pins 71. Each guide slit 65b has a length corresponding to a rotational angle of the rotor 70. The driving pins 71 are supported while being inserted in the guide slits 65b, and the driving pins move along the guide slits 65b when the rotor 70 rotates.

The second housing 65 includes a plurality of bosses 65c. Each boss 65c is preferably spaced from the aperture 65a. Therefore, even if the diaphragm unit 40 rotates by a small angle around the boss 65c, the aperture 65a may still be opened and closed.

The diaphragm unit 40 includes a plurality of lens shutters 41, 42, 43, and a plurality of ND (Neutral Density) filters 45, 46. The lens shutters 41, 42, 43 open or close an opening (hereinafter, it is referred to as the aperture) 65a of the first housing 65 to adjust the amount of incident light passing through the lens.

Figure 4:
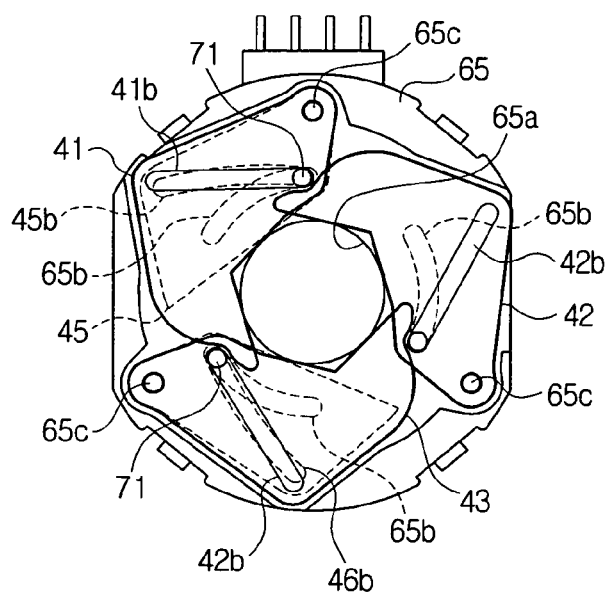
FIG. 4 is a top plan view of a diaphragm of FIG. 3 connected to a driving unit.

Referring to FIG. 4, the three lens shutters 41, 42, 43 respectively have holes 41a, 42a, 43a (refer to FIG. 2) adapted to engage the bosses 65c, and cam slits 41b, 42b, 43b adapted to receive the driving pins 71. The lens shutters 41, 42, 43 are preferably uniform in shape and size. Thus, when the driving pins 71 rotate along the cam slits 41b, 42b, 43b, naturally the lens shutters 41, 42, 43 engaged with them rotate at the same time. As a result, the size of the aperture 65a may be adjusted. Here, each of the cam slits 41b, 42b, 43b has a linear shape and a designated length.

Controlling the rotational angle of the rotor 70 enables the linear cam slits 41*b*, 42*b*, 43*b* to adjust light passing through the lens shutter 40, namely the f number (f. no) of incident light.

The ND filters 45, 46 are rotatably installed in the first motor housing 65. According to rotational positions of the ND filters 45, 46, the amount of incident light passing through the opened light path by the lens shutters 41, 42, 43 may be reduced. Each of the ND filters 45,46 has substantially the same shape. Moreover, the ND filters 45 and 46 respectively include holes 45*a*, 46*a* adapted to engage the bosses 65*c*, and cam slits 45*b*, 46*b*. The ND filters 45, 46 are installed in such a manner that they have substantially the same rotation with respect to designated shutters 41, 42, respectively, out of lens shutters 41, 42, 43. Although certain areas of ND filters 45, 46 are overlapped with the lens shutters 41, 42, they still move independently from each other. The driving pins 71 are received by the cam slits 45*b*, 46*b*. Accordingly, when the rotor 70 rotates, the cam slits 45*b*, 46*b* geared with the driving pins 71 rotate, and as a result of this, the ND filters 45, 46 also rotate to open or close the aperture 65*a*.

The cam slits 45*b*, 46*b*, each with a first section where the diaphragm stopped down portion varies according to changes of the aperture 65*a* and a second section where the diaphragm stopped down portion is constantly maintained, are movably installed with respect to the lens shutters 41, 42, 43. The cam slits 45*b*, 46*b* have predetermined lengths to be curved in a certain section so that each may be divided into first and second sections as described above and adapted to engage each other. The rotational angle and speed of the ND filters 45, 46 following the motion of the driving pins 71 are determined by the shape and position of the cam slits 45*b*, 46*b*, as with the lens shutters 41, 42, 43.

The ND filters 45, 46 are installed such that the portions of the first section overlapping the lens shutters 41, 42 varies. The surface area of each ND filter 45, 46 is preferably smaller than the surface area of each lens shutter 41, 42.

In the first section, the stopped down portion of the aperture 65*a* by the ND filter 45 is controlled to be inversely proportional to the openness of the aperture 65*a* by the lens shutter 41. When the aperture 65*a* is completely opened, the ND filter 45 is completely stopped down by the lens shutter 41 and is completely out of the range of the aperture 65*a*. While the stopped down portion of the diaphragm by the lens shutter increases approximately by 45-55%, the stopped down portion of the diaphragm by the ND filter 45 gradually decreases. This is possible by differentiating the rotational speed of the lens shutters 41, 42, 43 from the rotational speed of the ND filter 45 until the aperture 65*a* is opened from the minimum to about half.

In the second section, the stopped down portion of the aperture 65*a* by the ND filter 45 is maintained constant while the aperture 65*a* increases halfway to the maximum size. To this end, the rotation speed of the lens shutters 41, 42, 43 and the ND filter 45 in the second section are controlled to be substantially uniform. Thus, at both high and low brightness levels, a sufficient amount of incident light is obtainable, thereby resulting in improved resolution.

Also, the two ND filters 45, 46 may have different light transmittances. Each ND filter 45, 46 may stop down or cover the same area of the aperture 65*a*, but may have a different light transmittance. Therefore, it is possible to more precisely adjust the amount of incident light according to how much of the aperture 65*a* is opened.

Referring to FIG. 2, to prevent the diaphragm unit 40 from separating, a cover 80 is detachably connected to the second housing 65. The cover 80 has an opening 81 corresponding to the aperture 65*a*. A slit 83 corresponding to a guide slit 65*b* is formed around the opening 81. A plurality of holes 85 in the cover 80 correspond to the bosses 65*c*. An elastic locking unit formed around the cover 80 is interlocked to a combining unit formed on the outside circumference wall of the first housing 65.

The following description explains an assembling procedure of the diaphragm driving device, including disposing the diaphragm unit 40 in a camera unit.

First, the stator assembly 51 of FIG. 2 is assembled. Then the stator assembly 51 and the rotor 70 are put together, as shown in FIGS. 5A and 5B.

Figure 5A:
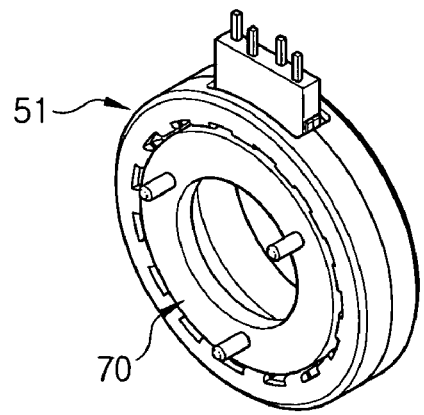
FIG. 5A and FIG. 5B respectively show a perspective view of a rotor of FIG. 2 connected with a stator assembly.
Figure 5B:
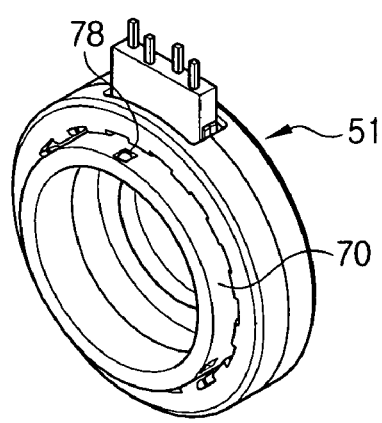
Figure 6A:
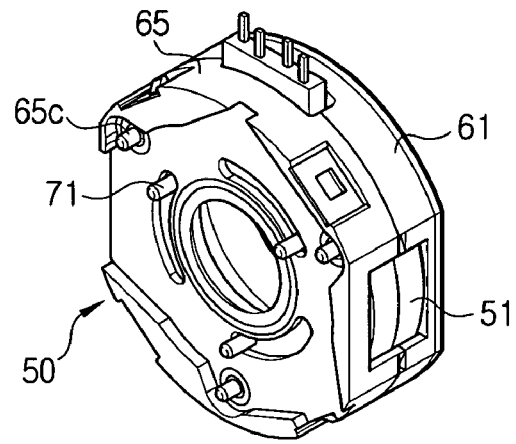
FIG. 6A and FIG. 6B respectively show a perspective view of a diaphragm driving device of FIG. 2 before a diaphragm is assembled thereto.
Figure 6B:
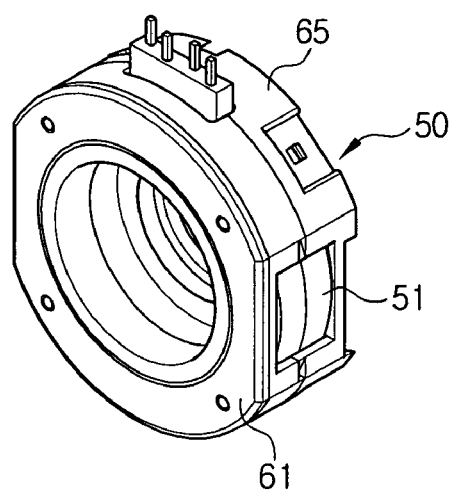

As shown in FIGS. 5A and 5B, the rotor 70 is disposed inside the stator assembly 51 but is not necessarily supported thereby. Thus, the first and second housings 61, 65 preferably encompass the stator assembly 51, respectively, as illustrated in FIGS. 6A and 6B. The driving pins 71 of the rotor 70 are inserted into the guide slits 65*b* of the second housing 65. The bearing 78 installed at the outer circumference of the rotor 70 is supported by the first housing 61. As shown in FIGS. 6A and 6B, after the driving unit 50 is assembled, the rotor 70 is rotatable in the guide slits 65*b*.

Following the assembly of the driving unit 50, the ND filters 45, 46 are engaged with the driving pints 71 and the bosses 65, respectively. Then the lens shutters 41, 42, 43 are assembled on the bosses 65*c* to overlap the ND filters 45, 46. In effect, parts of the lens shutters 41, 42, 43 are overlapped with the ND filters 45, 46.

Figure 7:
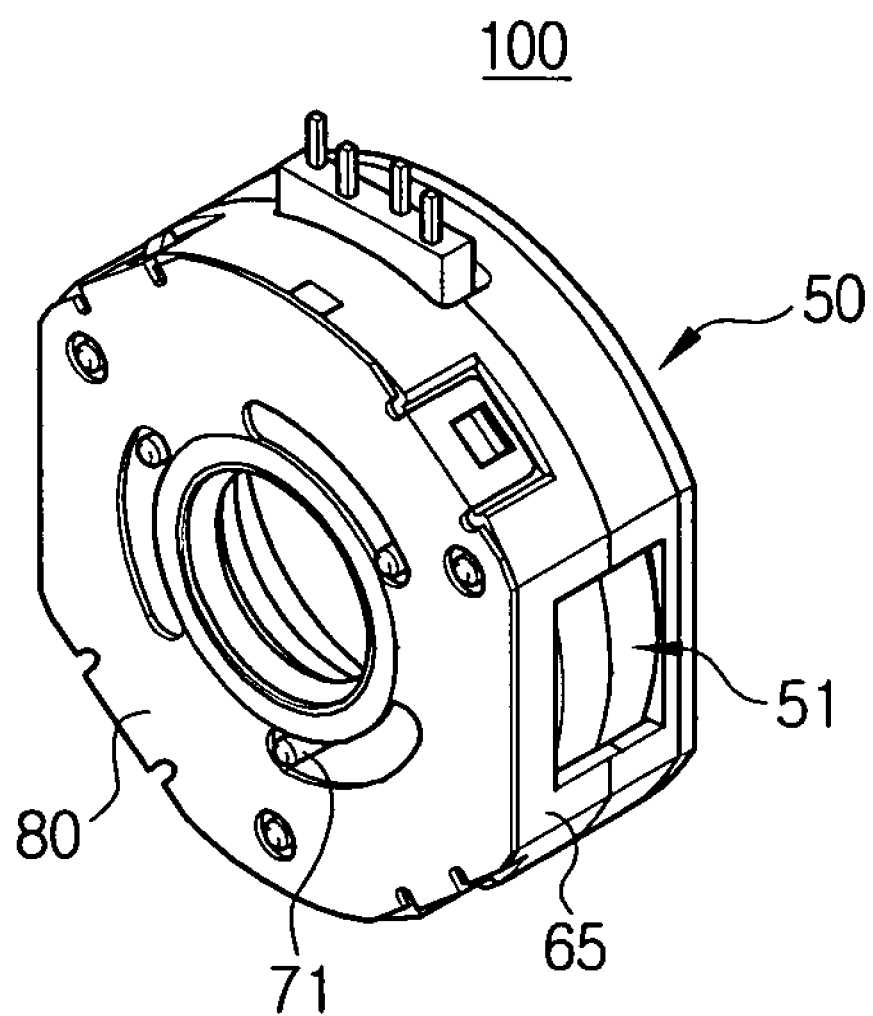
FIG. 7 is a perspective view of an assembled diaphragm driving device of FIG. 2.

To prevent the separation of the lens shutters 41, 42, 43 and the ND filters 45, 46 assembled into the second housing 65, the cover 80, as shown in FIG. 7, is assembled into the second housing 65, and thus, assembly of the diaphragm driving device 100 is complete.

As illustrated in FIG. 1, the assembled diaphragm driving device 100 is housed in the lens barrel 10. Other parts inside the lens barrel 10, namely the zoom lens module 20 and the focusing lens module 30, are assembled in accordance with conventional procedures.

A control method for the diaphragm unit 40 is described with reference to FIG. 4, FIG. 8A and FIG. 8B.

FIG. 4 depicts the diaphragm unit 40 in a completely opened condition. That is, the lens shutters 41, 42, 43 and the ND filters 45, 46 (FIG. 2) do not overlap the aperture 65*a*, but are outside of the aperture. In this position, the ND filters 45, 46 are completely outside the aperture 65*a*, and thus, do not influence the amount of incident light. More specifically, when the diaphragm unit 40 is completely opened, the ND filters 45, 46 are completely out of the light path so a deterioration of resolution does not incur.

Figure 8A:
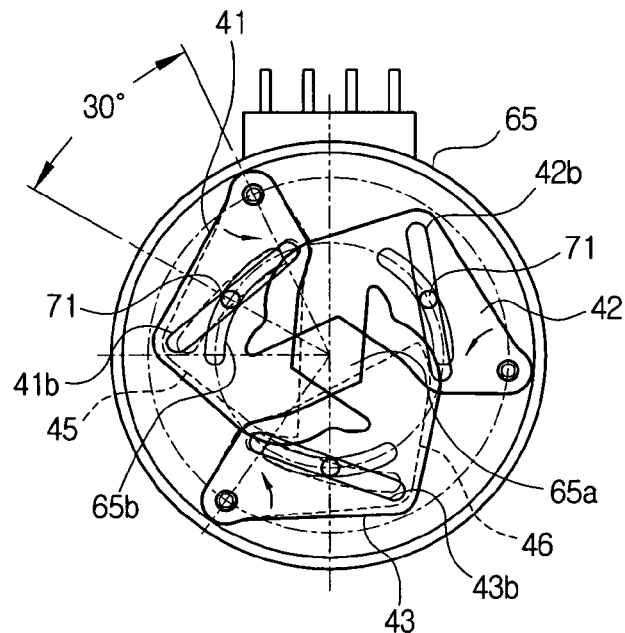
FIG. 8A and FIG. 8B respectively show top plan views of an iris diaphragm of FIG. 4 during operation.

If the rotor 70 rotates by a designated angle, as shown in FIG. 8A, when the diaphragm unit 40 is completely opened, the lens shutters 41, 42, 43 rotate by a certain angle and move to cover almost half of the aperture 65*a*. A section where the aperture 65*a* goes from the state of FIG. 8A to the state of FIG. 4 is called the first section. In the first section, the ND filters 45, 46 move along with the driving pins 71, and their rotational speed is different from the rotational speed of the lens shutters 41, 42, 43. In other words, the stopped down (or covered) portion of the aperture 65*a* by the ND filters 45, 46 changes by an amount inversely proportional to the size of the aperture 65*a*. In effect, the size of the aperture 65*a* is determined by the cam slits 45*b*, 46*b* of the ND filters 45, 46. Therefore, the rotational speed and angle may be controlled according to the design of the cam slits 45*b*, 46*b*.

Figure 8B:
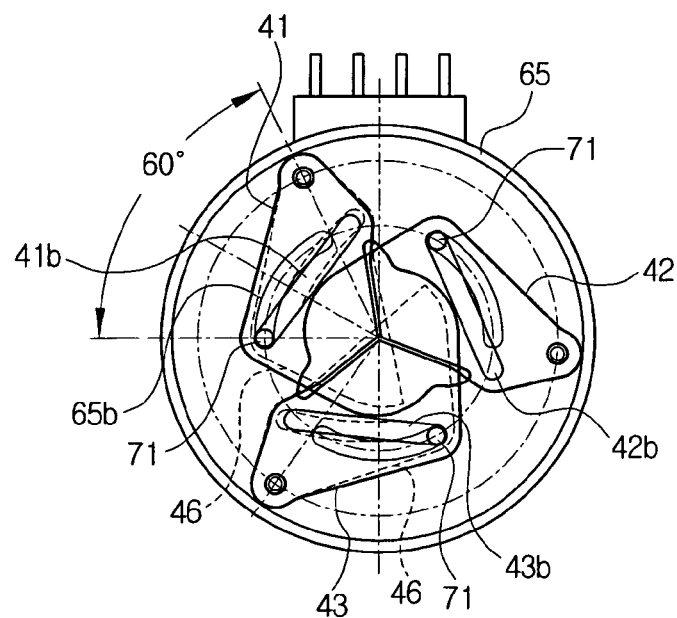

If the rotor 70 rotates further, the diaphragm changes its state from the one shown in FIG. 8A to the one shown in FIG. 8B. A section with this change of the aperture 65*a* is called the second section. In the state of FIG. 8B, the aperture 65a is completely stopped down (or covered) by the lens shutters 41, 42, 43. At first, the lens shutters 41, 42, 43 are partially overlapped with each other until they reach the center of the aperture 65a. In the second section, the lens shutters 41, 42, 43 and the ND filter 45 move along with each other or rotate together at the same speed as they are engaged with each other through the driving pins 71 of the rotor 70. Accordingly, in the first section or at high brightness the stopped down portion of the aperture 65a by the ND filter 45 is maintained constant.

In this embodiment, the cam slits 41b, 42b, 43b are linear. Therefore, to gradually change the percentage of openness of the aperture 65a or to gradually control the f number of incident light, the unit rotational angle of the rotor 70 is nonlinearly controlled.

Figure 9:
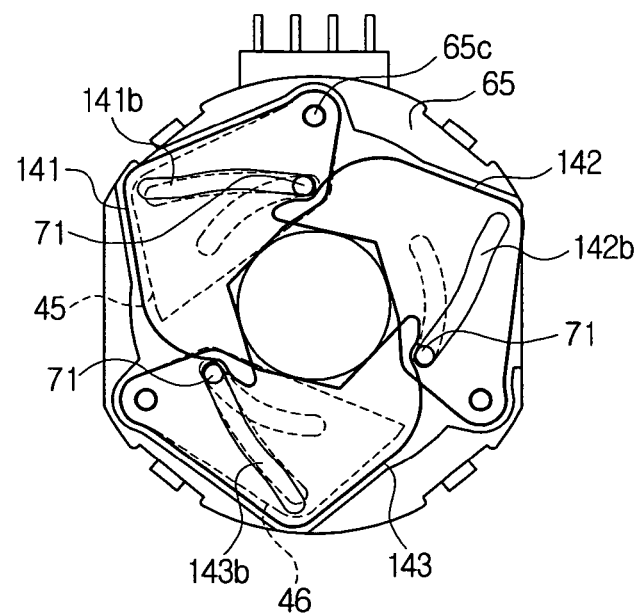
FIG. 9 and FIG. 10 are schematic plan views of a diaphragm driving device according to another embodiment of the present invention.
Figure 10:
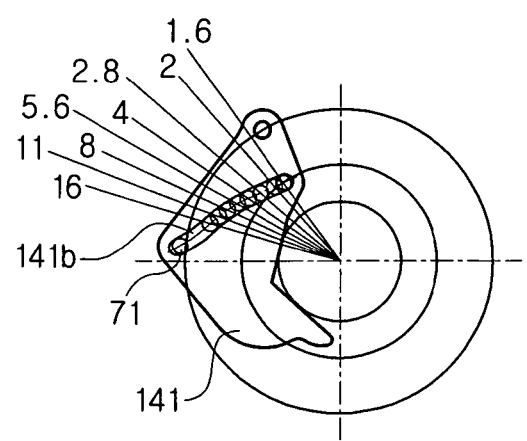

According to another embodiment shown in FIG. 9, the shutters 141, 142, 143 respectively have cam slits 141b, 142b, 143b in which each cam slit has a non-linear part. As shown in FIG. 10, when the driving pin 71 moves by a fixed unit angle, the cam slit 141b is preferably formed in a designated shape (which is obtained through experiments) to reach a certain f number (f. no). Therefore, the f number (f. no) may be controlled to a predetermined size by rotating the rotor 70 by a fixed angle. Since the rotor 70 rotates by a fixed unit angle, it is possible to differentiate rotational angles of the lens shutters 141, 142, 143 and controlling opening of the aperture 65a is also much easier.

Figure 11:
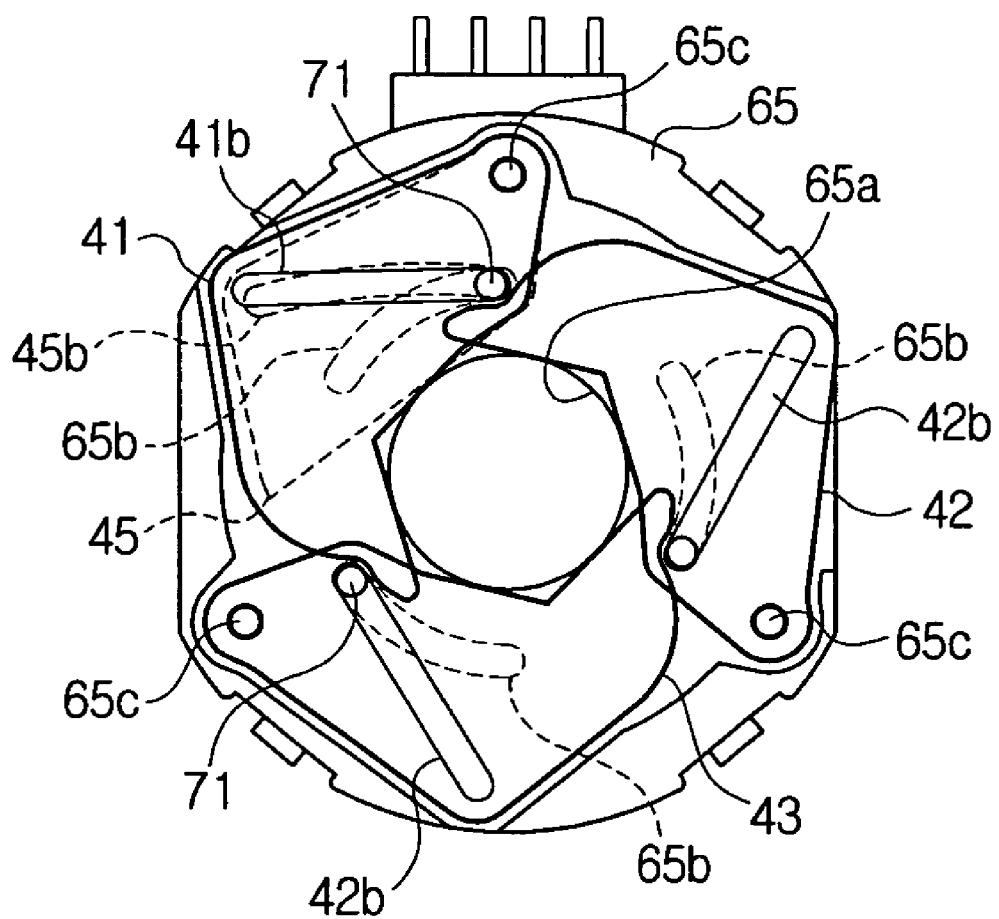
FIGS. 11 to 13 respectively show schematic plan views of the operation of a diaphragm driving device according to another embodiment of the present invention.
Figure 12:
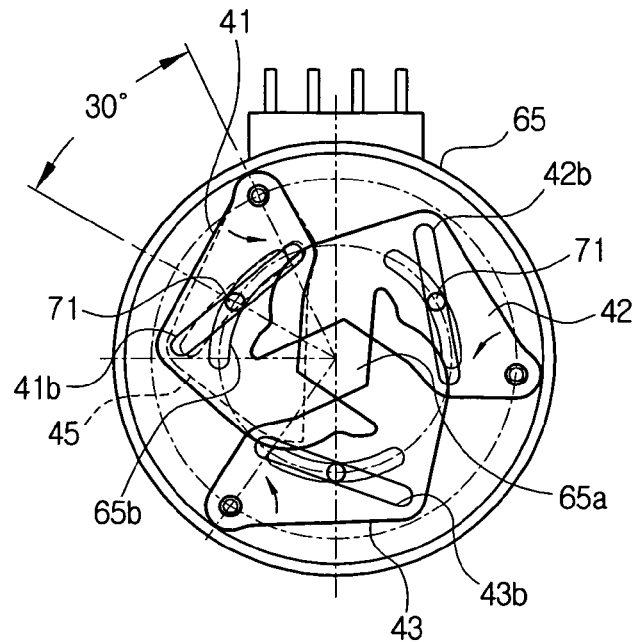
Figure 13:
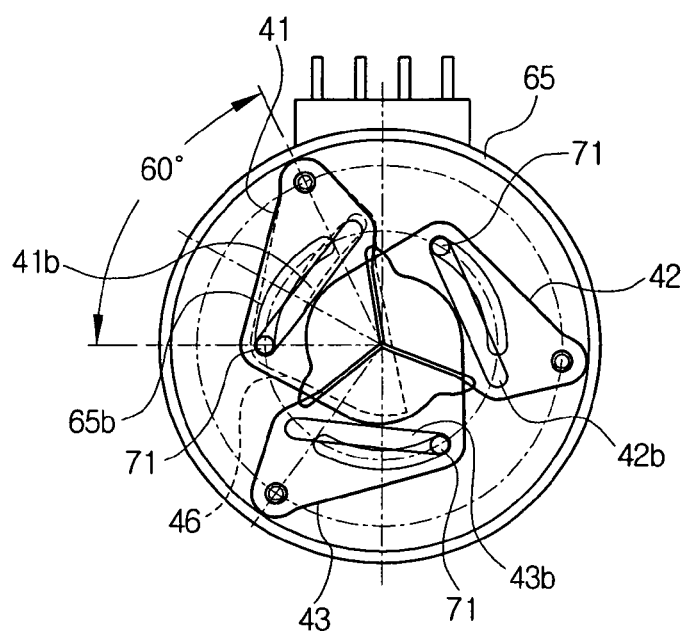

In addition, as shown in FIGS. 11 to 13, one single ND filter 45 may be used. In this embodiment, the ND filter 45 is rotatably installed by means of the driving pin 71. The ND filter 45 has the same center of rotation with one of the lens filters (e.g., the lens filter 41), and the ND filter 45 and the lens filter 41 move together almost at the same time by being connected to the same driving pin 71. The motion of the ND filter 45 is controlled to have the first and second sections in accordance with a change in the size of the aperture 65a by the lens shutters 41, 42, 43.

As described above, one or a plurality of the ND filters 45 may be used, as long as the ND filter(s) is installed to overlap the lens shutters 41, 42, 43. Thus, installation of the ND filter 45 becomes much easier, and an extra driving source for driving an additional ND filter 46 is not required. That is, one driving source is sufficient to drive a plurality of lens shutters 41, 42, 43 and a plurality of ND filters 45, 46, individually.

Figure 14:
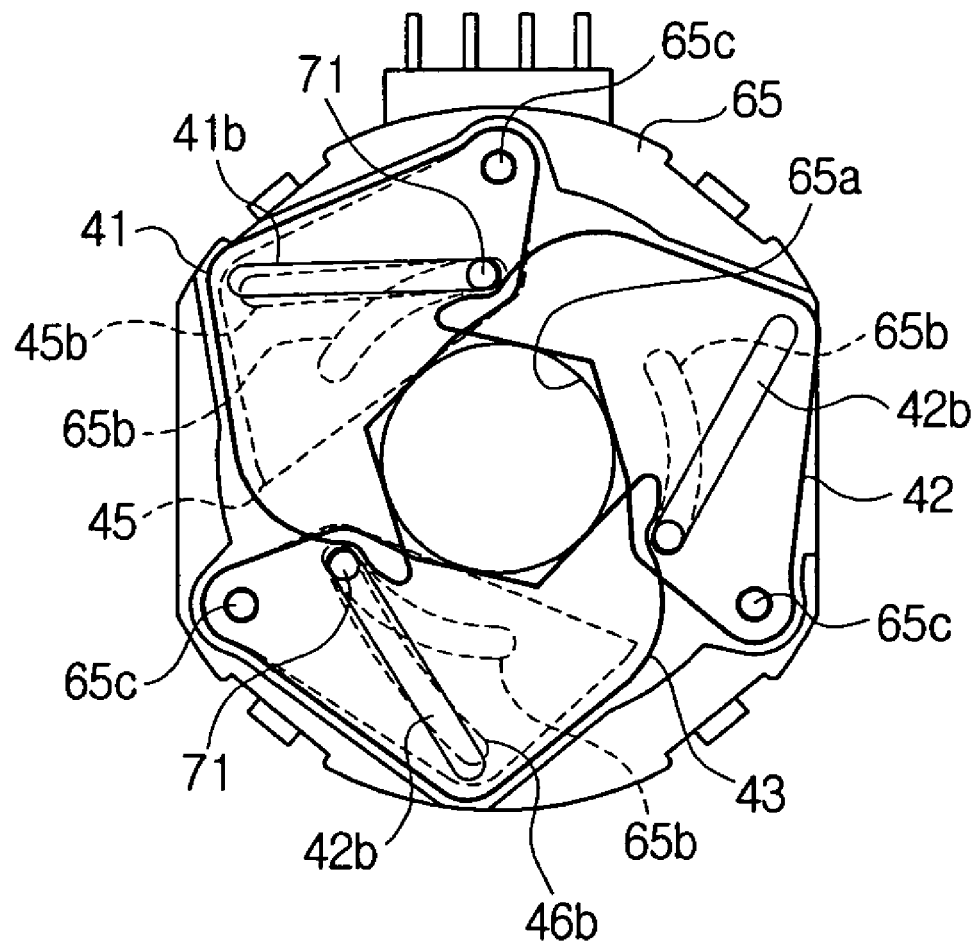
FIG. 14 is a schematic plan view of a diaphragm driving device according to another embodiment of the present invention.

Another exemplary embodiment of the diaphragm driving device is illustrated in FIG. 14. As shown in FIG. 14, each of the cam slits 45b, 46b of the ND filters 45, 46 has a different shape. The ND filter 45 has a linear-shaped cam slit 45b that is controlled to move in a way to make the stopped down (or covered) portion of the aperture 65a change in an amount inversely proportional to the size of the aperture 65a. In other words, the ND filter 45 does not have the first and second sections at the same time. On the other hand, in the case of the ND filter 46 having a curved cam slit 46b, the motion of the ND filter 46 is controlled to have the first and second sections. This embodiment is particularly advantageous in that the stopped down portion of the aperture 65a by the ND filter 45 or 46 may be more precisely controlled according to a change of the size of the aperture 65a.

By installing more than one ND filter and differentiating the shape of the cam slits engaged with the driving pins 71, it is possible to more effectively control the amount of incident light passing through the aperture 65a, thereby improving the resolution of images.

Also, by fitting a stepping motor inside the lens barrel, it is possible to control the lens shutters and the ND filters to move independently from each other.

Depending on how much the light path is opened, the ND filter(s) moves independently from the lens shutters, and this makes it possible to more precisely control the amount of incident light. Especially the present invention is capable of preventing a deterioration of light transmittance at low brightness and a deterioration of the resolution caused by diffraction.

The foregoing embodiment and advantages are merely exemplary and are not to be construed as limiting the present invention. The present teaching may be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. An iris diaphragm device of image photographing equipment, comprising:
at least one lens shutter to adjust the size of an aperture through which incident light passes according to the position of the at least one lens shutter, the at least one lens shutter being rotatable about a pivot point; and
at least one directly and independently movable ND filter installed to move independently of each of the at least one lens shutter and in the aperture over a range of aperture sizes to reduce the amount of incident light by covering the aperture stopped down by the lens shutter according to the position of the at least one ND filter.

2. The device according to claim 1, wherein
the at least one ND filter is installed to move relative to the at least one lens shutter so that a portion of the aperture stopped down by the at least one ND filter is varied in one section and is fixed in another section.

3. The device according to claim 2, wherein
the at least one ND filter in the section with the variable stopped down portion is installed to move relative to the lens shutter and inversely proportional to an increment of the aperture.

4. The device according to claim 2, wherein
the at least one ND filter is installed to move relative to the lens shutter so that the portion of the aperture stopped down by the at least one ND filter is fixed when 45-55% of the aperture is opened.

5. The device according to claim 2, wherein
the at least one ND filter is rotatably installed around the aperture, and stops down the aperture according to the rotational position of the at least one ND filter.

6. The device according to claim 5, wherein
the at least one lens shutter is rotatably installed around the aperture, and varies the aperture according to the rotational position of the at least one lens shutter.

7. The device according to claim 2, wherein
the at least one ND filter and the at least one lens shutter are installed to rotate with respect to the same center around the aperture.

8. The device according to claim 7, wherein
the stopped down portion and the size of the aperture are determined in accordance with the rotational angle of the at least one ND filter and the at least one lens shutter, respectively.

9. The device according to claim 2, wherein
a plurality of ND filters are installed, each of the plurality of ND filters having a different center of rotation.

10. The device according to claim 9, wherein
each of the plurality of ND filters have different light transmittances.

11. The device according to claim 9, wherein
a plurality of lens shutters are installed, each of the plurality of lens shutters having the same center of rotation as the respective one of the plurality of ND filters.

12. The device according to claim 2, wherein
the at least one ND filter and the at least one lens shutter respectively have cam slits for rotation.

13. The device according to claim 12, wherein
the cam slits for the at least one ND filter and the at least one lens shutter have different shapes.

14. The device according to claim 12, wherein
the cam slit for the at least one ND filter is curved in a designated section.

15. The device according to claim 12, wherein
the cam slits for the at least one ND filter and the at least one lens shutter are formed to overlap in a designated section so that the at least one ND filter and the at least one lens shutter have the same rotational speed in the designated section.

16. The device according to claim 15, wherein
the rotational speed is constant, and the stopped down portion is fixed.

17. An iris diaphragm device of image photographing equipment, comprising:
at least one lens shutter to adjust an aperture through which light passes, the at least one lens shutter being rotatable about a pivot point;
at least one directly and independently movable ND filter installed to move independently of each of the at least one lens shutter and in the aperture over a range of aperture sizes to reduce the amount of incident light by covering the aperture that is opened by the lens shutter; and
a driving unit to drive the at least one ND filter and the at least one lens shutter so that the stopped down portion of the aperture by the at least one ND filter is varied in one section and is fixed in another section.

18. The device according to claim 17, wherein
a motor housing supports the at least one ND filter and provides the light path;
a stator assembly is installed inside the motor housing; and
a rotor is rotatably installed inside the stator assembly to interlock the at least one ND filter to the at least one lens shutter.

19. The device according to claim 17, wherein
the at least one ND filter is rotatably installed in a position of the motor housing to cover the aperture being stopped down by the lens shutter according to the rotational position of the at least one ND filter.

20. The device according to claim 17, wherein
the rotor has driving pins to interlock the at least one ND filter to the at least one lens shutter.

21. The device according to claim 19, wherein
a boss supports the rotary at least one ND filter; and
a guide guides the motion of the driving pins.

22. The device according to claim 18, wherein
the at least one ND filter has a cam slit having a designated shape, the at least one ND filter being connected to the driving pin and interlocked to the driving pin.

23. The device according to claim 22, wherein
the cam slit for the at least one ND filter is curved.

24. The device according to claim 18, wherein
the at least one lens shutter is supported by the motor housing to have the same center of rotation as the at least one ND filter.

25. The device according to claim 22, wherein
the at least one lens filter has a cam slit that is interlocked by a driving pin of the rotor.

26. The device according to claim 25, wherein
the cam slits for the at least one ND filter and the at least one lens shutter have different shapes.

27. The device according to claim 25, wherein
the cam slits for the at least one ND filter and the at least one lens shutter are partially overlapped according to rotational positions thereof.

28. The device according to claim 27, wherein
the stopped portion of the aperture is fixed in a section where the cam slits for the at least one lens shutter and the at least one ND filter overlap.

29. The device according to claim 17, wherein
a change of the stopped down portion of the aperture by the ND filter is inversely proportional to the size of the aperture.

30. The device according to claim 17, wherein
the device has a plurality of lens shutters and a plurality of ND filters.

31. The device according to claim 30, wherein
the plurality of ND filters have cam slits of different shapes.

32. A camera unit, comprising:
a lens barrel;
a zoom lens module housed in the lens barrel;
a focusing lens module housed in the lens barrel;
at least one lens shutter movably installed between the zoom lens module and the focusing lens module to adjust an aperture through which light passes through according to the position of the at least one lens shutter, the at least one lens shutter being rotatable about a pivot point;
a directly and independently movable ND filter movably installed inside the lens barrel to reduce the amount of incident light by covering the aperture that is stopped down by the at least one lens shutter, the ND filter being movable independently of each of the at least one lens shutter; and
a driving unit installed inside the lens barrel to drive the lens shutter and the ND filter such that the stopped down portion of the aperture by the ND filter is varied in one section and is fixed in another section.

33. The camera unit according to claim 32, wherein
a motor housing is installed inside the lens barrel to support rotation of the at least one lens shutter and the at least one ND filter;
a stator assembly is installed inside the motor housing; and
a rotor rotatably is installed inside the stator assembly to interlock the at least one lens shutter to the at least one ND filter.

34. The camera unit according to claim 33, wherein
the at least one lens shutter and the at least one ND filter are installed to have the same center of rotation.

35. The camera unit according to claim 33, wherein
the rotor has at least one driving pin to interlock the at least one lens shutter and the at least one ND filter.

36. The camera unit according to claim 35, wherein
each of the at least one lens shutter and the at least one ND filter has an axis hole as the center of rotation and a cam slit interlocked by the driving pin.

37. The camera unit according to claim 36, wherein
the cam slits for the at least one ND filter and the at least one lens shutter have different shapes.

38. The camera unit according to claim 37, wherein
the cam slit of the at least one ND filter is curved in a designated section.

39. The camera unit according to claim 32, wherein the varied stopped down portion is inversely proportional to the size of the aperture.

40. The camera unit according to claim 32, wherein the fixed stopped down portion overlaps with a section where the aperture is gradually reduced from a maximum.

41. A method of controlling a diaphragm, the method comprising the steps of:
moving at least one lens shutter to stop down an aperture that incident light passes through, the at least one lens shutter being rotatable about a pivot point; and
directly and independently moving at least one ND filter to cover the stopped down aperture to reduce the amount of incident light, wherein the decrement of incident light is fixed or varied according to a change of the aperture size, the at least one ND filter being moved independently of each of the at least one lens shutter.

42. The method according to claim 41, further comprising varying the decrement of incident light in inverse proportion to the increment of the aperture size.

43. The method according to claim 41, further comprising fixing the decrement of incident light in a designated section where the aperture is gradually reduced from a maximum.

44. The method according to claim 41, further comprising moving the lens shutter and the ND filter together.

45. The method according to claim 41, further comprising differentiating rotational speeds of the at least one lens shutter and the at least one ND filter to vary the decrement of incident light.

46. The method according to claim 45, further comprising equalizing the rotational speed of the at least one lens shutter to that of the at least one ND filter to fix the decrement of incident light.

47. A shutter device for a camera, comprising:
a shutter element having a cam slit;
a neutral density filter blade having a cam slit; and
a driving means for moving the shutter element and the neutral density filter blade,
wherein the filter blade and the shutter element have a common center of rotation, and the cam slit of the neutral density filter blade and the cam slit of the shutter element differ in shape so as to control the degree of rotation of the neutral density filter blade and the shutter element, and the rotational speeds of the lens shutter element and the neutral density filter blade are controlled to be different in one section of the cam slits of the neutral density filter blade and the shutter element and to be substantially uniform in another section of the cam slits of the neutral density filter blade and the shutter element.

* * * * *